(No Model.)

W. TATTERSALL.
BELT FASTENER.

No. 442,740. Patented Dec. 16, 1890.

Witnesses:
Thomas Durant.
E. D. Smith.

Inventor
William Tattersall

UNITED STATES PATENT OFFICE.

WILLIAM TATTERSALL, OF BRADFORD, ENGLAND.

BELT-FASTENER.

SPECIFICATION forming part of Letters Patent No. 442,740, dated December 16, 1890.

Application filed January 3, 1890. Serial No. 335,786. (No model.)

*To all whom it may concern:*

Be it known that I, WILLIAM TATTERSALL, a subject of the Queen of Great Britain, residing at Bradford, in England, have invented certain new and useful Improvements in Belt-Fasteners, of which the following is a specification.

This invention relates to improvements in belt-fasteners for connecting the ends of driving-belts or belts for transmitting power, the object being to provide a simple and efficient device which, in addition to holding the ends firmly together, will cover or protect the same and at the same time not project beyond the edges of the belt, thereby permitting it to be run on flanged pulleys or between guides, &c.

The invention consists in certain novel details of construction and combinations of parts to be hereinafter described, and pointed out particularly in the claim at the end of this specification.

Figure 1:
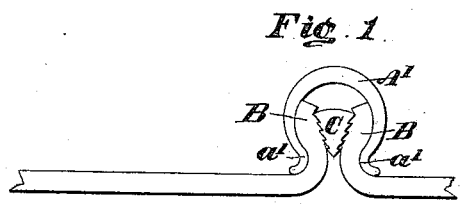
Figure 2:
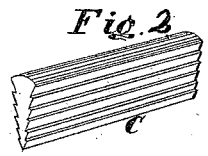
Figure 3:
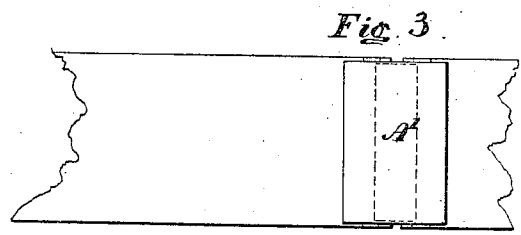
Figure 5:
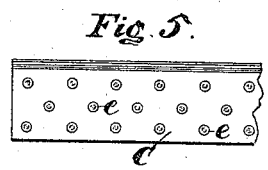
Figure 4:
Figure 6:

Referring to the accompanying drawings, Figure 1 is a side elevation of the two ends of a belt united by a fastening constructed in accordance with my invention. Fig. 2 is a perspective view of the wedge employed in Fig. 1. Fig. 3 is a top plan view of the form shown in Fig. 1. Fig. 4 is an elevation of a modified form of fastening device, and Figs. 5 and 6 are views of a modified form of wedge.

Like letters of reference in all the figures indicate the same parts.

In the preferred form (shown in Figs. 1, 2, and 3) the fastener consists of a clamp A', of substantially horseshoe-shape in cross-section, the crown or bow of the same forming an enlarged chamber for the reception of the extreme ends of the belt, the clamp in this instance extending from side to side of the belt, but does not project beyond the edges thereof.

In applying the fastener the ends of the belt are first pressed together with the wedge C or equivalent between them. Then the clamp is slipped on from one edge. Any strain tending to pull the belt ends apart then draws the wedge down and causes the ends to bind tightly between the walls $a'$ $a'$ of the narrow or throat portion of the clamp. The wedges C are preferably roughened or provided with holding teeth or corrugations $c$, as in Fig. 2, or else provided with a series of small points or projections, as shown in Figs. 5 and 6, the object being to prevent the slipping of the belt on the wedge in a direction to cause its release.

It is obvious that the form of the clamp may be considerably varied, and it need not extend entirely across the belt, as two or more sections may be employed, or the form shown in Fig. 4 may be used without departing from the spirit of my invention.

The form of clamp last mentioned consists of a simple cylindrical body bent into proper shape, the ends of the belt being united by the application of any desired number of clamps.

With this fastener there are no projections at the side of the belt, and it may therefore pass through guides or around flanged pulleys without obstruction, and, further, there is no impediment to the bending of the belt in its passage around the pulleys—a common fault with many fastening devices.

Having thus described my invention, what I claim as new is—

The combination, with the clamp having the rigid bowed portion forming a chamber for the reception of the ends of the belt, and the narrow throat portion, of the belt having its ends inserted in said clamp, and the removable wedge for preventing the withdrawal of the same, lying within the chamber, substantially as described.

In testimony whereof I have hereunto set my hand in the presence of two subscribing witnesses.

WILLIAM TATTERSALL.

Witnesses:
SAMUEL A. DEACUP,
DAVID NOWELL.